Jan. 12, 1965 R. W. KILBURN ETAL 3,165,415
MODIFYING TASTE OF FRUIT JUICE BY DIALYSIS
Filed Oct. 4, 1960 3 Sheets-Sheet 1

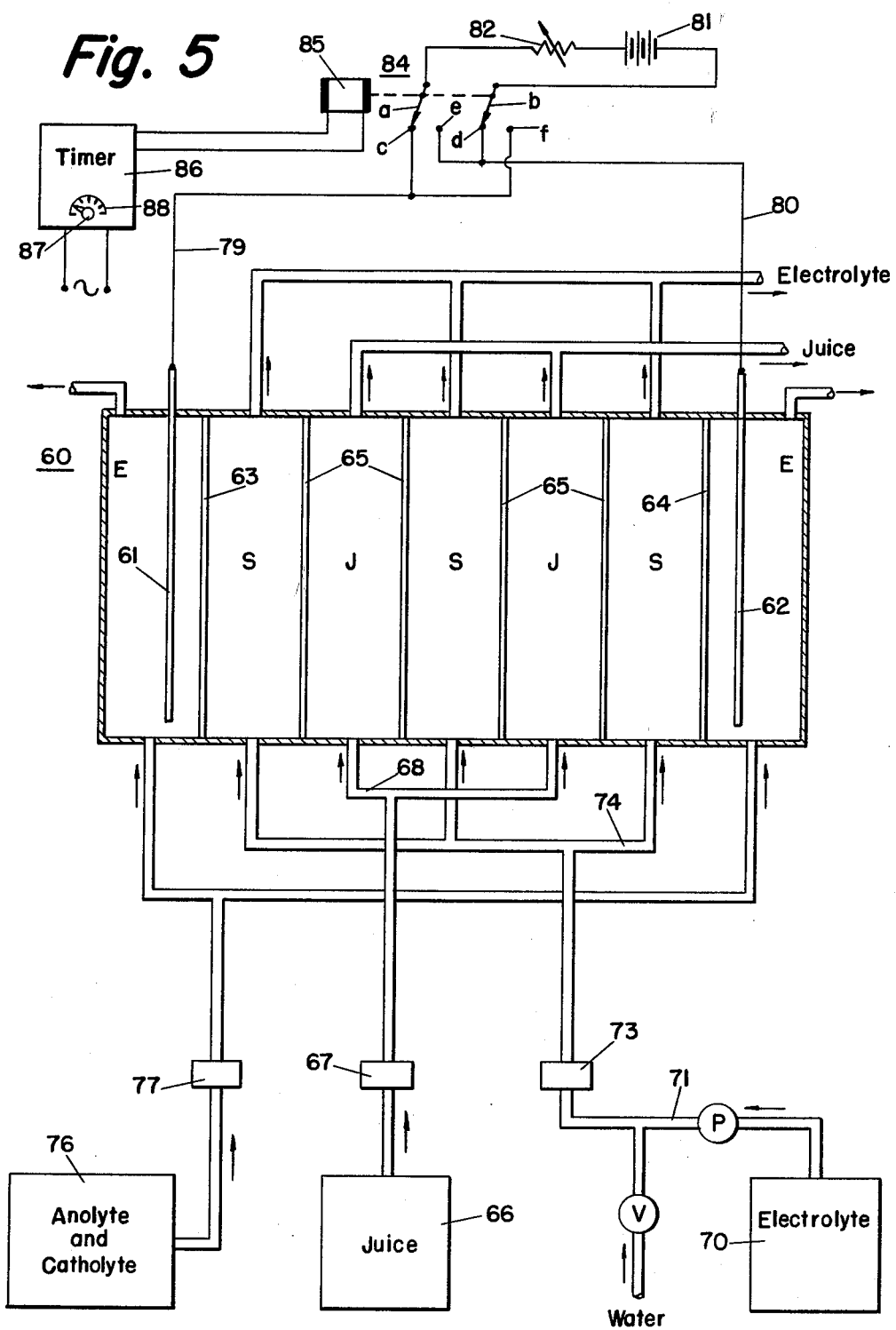

United States Patent Office 3,165,415
Patented Jan. 12, 1965

3,165,415
MODIFYING TASTE OF FRUIT JUICE BY DIALYSIS
Robert W. Kilburn, Lake Wales, Fla., and Harry P. Gregor, Hewlett, N.Y., assignors, by mesne assignments, to American Machine & Foundry Company, a corporation of New Jersey
Filed Oct. 4, 1960, Ser. No. 60,495
8 Claims. (Cl. 99—105)

This invention relates to the improvement of the taste of fruit juice and has for an object the provision of methods of and apparatus for changing the pH of the natural fruit juice by means of ion exchange.

It is well-known that consumers judge the acceptability of food, and fruit juices in particular, to a great extent on the basis of flavor. Flavor is a complex reaction of the taste and olfactory receptors to components in the food. Fruit juice and citrus juice in particular stimulates all four areas of taste sensitivity; namely, sweetness, tartness, saltiness and bitterness. Bitterness is readily apparent in grapefruit juice and is also present to some extent in other fruit juices. The salt taste, while not as noticeable as other characteristics, is, nevertheless, a palatability factor. Citrate salts play an important role in determining the tartness of citrus juices by repressing the ionization of citric acid.

A distinguishing characteristic of citrus juice is the tart taste caused by the organic acids present in varying amounts in the juice of all species of citrus. The concentration of acid can be readily measured but the numerical value has limited usefulness as an expression of the degree of the tartness of juices. In general, tartness is directly proportional to the acid concentration but the degree of correlation is not high in natural strength citrus juices. Juices with identical citric acid content frequently exhibit variation in tartness when tasted.

Tartness of citrus juices is balanced by the sweet taste and it is frequently necessary to add sugar when overly-tart citrus juice is processed to make the juice more palatable. A term commonly used in the citrus industry to express relationship of sweetness to tartness is the Brix/acid ratio. The Brix/acid ratio is the numerical value obtained by dividing the Brix, expressed as grams of soluble solids per one hundred grams of juice by the acid concentration, expressed as grams of anhydrous citric acid per one hundred milliliters of juice. Tartness is inversely proportional to the ratio.

The importance of balance of sweetness to tartness is recognized in federal and state standards of quality which specify limits of Brix/acid ratio. For example, the Brix/acid ratio is used to define maturity of citrus fruit by legislative act in Florida and California. As citrus fruits mature, the citric acid concentration in the juice decreases while Brix increases slightly or remains unchanged. The increasing Brix/acid ratio is considered a measure of advancing maturity of ripening fruit. In the citrus industry a legal minimum limit is set on the Brix/acid ratio for each species of citrus fruit and any fruit under this minimum value is considered immature.

While the Brix/acid ratio is a generally useful expression for tartness of citrus juices among technologists in the citrus industry, it is meaningless to those who are unfamiliar with the correlation between the two factors. The measurement of hydrogen ion activity is a useful supplemental method of expressing the tartness of juice. pH, a property of aqueous acid solutions familiar to food technicians in all fields, can be used to express tartness of juice on a broadly understandable basis. The hydrogen ion is believed to be the chemical agent responsible for the sensation of tartness, although other factors are involved in the psychological reaction. This may be demonstrated by adding sugar, artificial sweetener or sodium chloride to juice which will seem less tart even though the hydrogen ion activity remains unchanged. In general, however, tartness is inversely proportional to the pH, and the degree of correlation between the two factors appears to be high in citrus juices.

Citrus juice is a buffered solution which contains weak acids, primarily citric, and salts of weak acids, predominantly potassium salts. The hydrogen ion concentration in a buffered solution is determined by the nature of the acid and by the concentrations of salt and acid as given in the following formula:

$$pH = pK_a + \log C_s/C_a$$

where $pK_a = -\log K_a$;
$K_a$ is the ionization constant of the acid;
$C_s$ is the concentration of salt; and
$C_a$ is the concentration of acid.

Juice obtained from different lots of citrus fruit exhibit considerable variable in pH. This apparently is due to the long duration of the season, variability in bud wood, root stock, soil, maturity, rainfall and cultural practice in the widespread area in which commercial fruit is grown. Since there is a close correlation between pH and tartness, a study was made to learn whether variation of acidity or salt concentration is the predominant factor determining the tartness of juice. It was found that the average value of the concentration of salts in juice, for example grapefruit, is the same throughout the entire season and that the variation in the pH of grapefruit juice is due primarily to differences in free acidity. As seen from the foregoing equation, the pH of the juice depends primarily upon the relative concentration of the salts and free acids rather than upon the absolute value of either. While the addition of alkali, to reduce the concentration of free acid by neutralization, will raise the pH of the juice to reduce the tartness, the addition of alkali also raises the concentration of salt in the juice. The increased salt concentration is detectable by taste and as a result an unusual taste is imparted to the juice. Additionally, in many instances the Federal Department of Agriculture does not permit the use of such additives in juices.

In accordance with the present invention there is provided a process for improving the taste of fruit juice without modification of the vitamin content or imparting a salt taste to the juice and without the use of additives. The pH of the juice can be raised from its natural or normal value to a desired value by lowering the concentration of free acid by ion exchange to reduce the anion concentration. This process does not change the saltiness and a more natural-tasting juice results. The ion exchange process substitutes the anion of a more weakly ionized acid for a portion of the organic acid normally present in the juice. The type of organic acid present is determined by the type of juice. For example, in citrus fruits and pineapple, the predominant organic acid is citric acid; in grapes, it is tartaric acid; in apples, it is malic acid; and all fruits have a small amount of succinic acid. The most effective anions for the purpose of substitution are hydroxyl, carbonate and bicarbonate.

Vitamin C, the main vitamin in fruit, is a weak acid and its ionization is greatly repressed in juice. Carotene or provitamin A, the second most abundant vitamin in fruit, is not water soluble and hence nonionic. Thus, there is substantially no modification of the vitamin content by the present process.

The present invention is not only applicable to fruit juices of the foregoing type, and particularly citrus fruit juices, such as grapefruit and orange juice, but it is also applicable to vegetable juices, such as tomato juice. In certain parts of the United States, such, for example, as California, tomato juice has a a high normal pH value as the result of a high potassium citrate-citric acid ratio. The juice is too low in acid to be pasteurized easily and no citric acid can be added because of the FDA. Therefore, it is necessary to utilize pressure cookers in the pasteurization of California tomato juice. If the normal pH of around 4.2 were lowered by about 0.2 to 0.3 unit, pressure would not be required for pasteurization. Thus, it is a further object of the invention to lower the normal pH of the juice through ion exchange by substituting hydrogen ions for salt cations normally present. The natural or normal pH values for most fruits and vegetables to which the present invention is particularly applicable fall within the range of about 2.5 to 5.5 pH and the range of adjustment of pH provided by the present invention is about ±0.5 pH change from the natural value. For example, grapefruit juice having a natural pH of 3.1 may be raised to a desired value of about 3.6. Orange juice having a natural pH of about 3.3 may be raised to a desired value of about 3.8 and tomato juice having a natural pH of about 4.2 may be lowered to a desired value of about 3.7. It is to be understood that the foregoing values represent ranges and that if desired, less change in the pH value may take place within these ranges.

In accordance with the present invention, there is provided a method of improving the taste of a natural fruit or vegetable juice having a normal pH differing from a desired value affording the improved taste by changing the pH to the desired value. Such method comprises the steps of passing a flow of natural juice of normal pH through chambers of a multi-chamber dialysis apparatus having a plurality of alternating juice and electrolyte chambers which are separated from each other by ion perm-selective membranes. A flow of electrolyte is passed through the electrolyte chambers to create an ion exchange through the membranes to alter the relative concentration of acids and salts in the juice and the concurrent flow of the juice and the electrolyte continues until the ion exchange between the adjacent chambers has altered the pH of the natural juice to the desired value affording the improved taste.

Further in accordance with the invention, there is provided a method of improving the taste of natural fruit or vegetable juice without the addition of additives or modification of vitamin content. Such method comprises the steps of passing a flow of the natural juice through juice chambers of a multi-chamber dialysis apparatus having a plurality of alternating juice and solution chambers which are separated from each other by ion perm-selective membranes, passing a flow of solution through the solution chamber to create an ion exchange through the membranes to adjust the relative concentration of acid and salts in the juice by ion transfer through perm-selective membranes, the solution comprising at least one from a group consisting of hydrogen, sodium, potassium, magnesium, ammonium, sulphate, acetate, citrate, lactate, chloride, hydroxyl, carbonate, bicarbonate, nitrate and phosphate, and establishing the relative flow rate of the juice and the solution through their respective chambers for which the normal pH is adjusted within the range of ±0.5 pH from the normal pH to a desired value of pH affording the improved taste.

More specifically, there is provided in accordance with one aspect of the invention a method for improving the taste of fruit juices by raising the normal pH thereof to a desired value affording the improved taste without the use of additives or modification of the vitamin content. Such method comprises the steps of producing on opposite sides of a film of synthetic anion exchange resin a flow of natural fruit juices of normal pH below said desired value and a flow of a caustic solution, and creating an ion exchange through the film to reduce the anion concentration in the juice by the substitution in the juice of an anion of a more weakly ionized acid for a portion of the organic acids, such as citric or malic acid, normally present in the juice and thus reduce the acidity thereof without changing the concentration of salts normally present in the juice.

In accordance with a further aspect of the invention there is provided a method for improving the taste of fruit and vegetable juices such as tomato juice or the like by lowering the normal pH thereof to a desired value affording the improved taste without the use of additives or modification of the vitamin content, such method comprising the steps of producing on opposite sides of a film of synthetic cation exchange resin a flow of natural juice of pH above said desired value and a flow of acid solution, and creating an ion exchange through the film to increase the hydrogen in concentration in the juice by substitution for a portion of the alkali metal cations, such as potassium, sodium and magnesium, normally present in the juice.

It is another object of the invention to provide a fruit or vegetable juice normally having pH value differing from a desired value which affords an improved taste, the normal pH of which has been adjusted to the desired value by ion transfer to provide the improved taste in the absence of additives or modification of vitamin content.

It is a further object of the invention to provide a natural fruit juice, normally having a tart, inferior taste and a pH value below a desired value which affords an improved taste, the normal pH of which has been raised to the desired value by ionic transfer through an anionic permeable resin to reduce tartness resulting in an improved taste for the juice without modification of the vitamin content.

A further object of the invention is the provision of apparatus for improving the taste of a natural fruit or vegetable juice having normal pH differing from a desired value affording the improved taste by changing the pH to the desired value. The apparatus comprises a multi-chamber electrodialysis device having a plurality of alternating juices and electrolyte chambers between two end electrolyte chambers, the two end electrolyte chambers each containing an electrode, said chambers being separated from each other by ion perm-selective membranes, means for controlling the flow of natural fruit juice of normal pH through said juice chambers, means for controlling the rate of flow of electrolyte through said electrolyte chambers to create an ion exchange through said membranes to alter the relative concentration of acids and salts in the juice, and means for controlling the passage of a direct electric current in series across the alternating juice and electrolyte chambers and membranes to control the time for altering the pH of the natural juice to the desired value affording the improved taste.

For further objects and advantages of the invention and a more detailed disclosure thereof reference is had to the following description taken in conjunction with the accompanying drawings in which:

FIG. 5 is a diagrammatic view of electrodialysis apparatus with separate electrode compartment construction for ion exchange between juice and a caustic solution.

Figure 1:
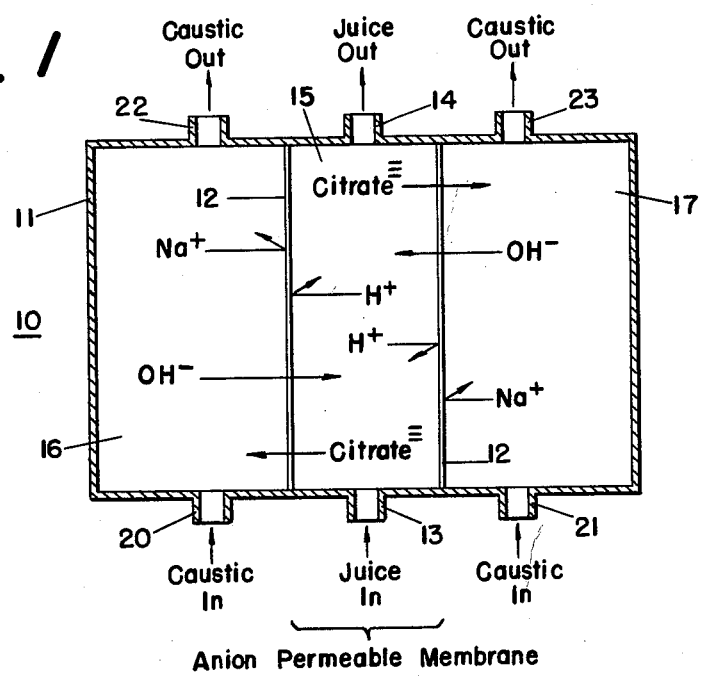
FIG. 1 is a diagrammatic view in elevation of a cross-section of a sample cell for raising the normal pH of a fruit juice to a desired value affording improved taste by anion exchange through anion permeable membranes.

Referring to FIG. 1, there is diagrammatically illustrated a sample cell 10 for raising the pH of fruit juices. The cell or device 10 comprises a container 11 which is divided into three separate compartments or chambers 15–17 by a pair of anion permeable membranes 12. The anion permeable membranes 12 may be of various suitable types, such for example as the type available under the trademark "Nalfilm 2" from the National Aluminate Corporation or the type disclosed in Belgian Patents 537,438 and 568,266 and available commercially under the trademark "TNO," the latter type being preferred. The "TNO" membranes are made of styrenized polythene to which the appropriate ion-exchange groups are attached. The Belgian Patent 568,266 describes the TNO membrane types of the production thereof while Belgian Patent 537,438 describes the general principle of treating a hydrophobic sheet in manner such as to render it hydrophilic.

As will be seen from FIG. 1, the fruit juice, which in its normal state has a pH below the desired value affording improved taste, is introduced into the chamber 15 of the container 11 by way of an inlet 13 at the bottom of container 11. In the line to the inlet 13 there normally is a proportioning means such as a valve or pump, not shown (for controlling the flow rate of the juice. The flow of juice through container 11 is in an upward direction, passing through an outlet 14 at the top of container 11. The juice compartment or chamber 15 is located between compartments 16 and 17 through each of which passes a flow of caustic. The flows of caustic are also in an upward direction, the same as the juice, the caustic entering the respective chambers 16 and 17 through inlets 20 and 21 at the bottom of container 11 and leaving the respective chambers 16 and 17 by way of outlets 22 and 23 at the top of container 11. In the lines to the inlets 20 and 21 there normally are proportioning means such as valves, or pumps, not shown, for controlling the flow rate of the caustic relative to that of the juice. The normal pH of the juice as it passes through the chamber 15 is raised to the desired value without imparting a salt taste to it by lowering the concentration of free acid by ion exchange to reduce the anion concentration. This process does not change the saltiness or materially modify the vitamin content and an improved or more natural tasting juice results. The ion-exchange process substitutes the anion of a more weakly ionized acid for a portion of the organic acids, such as citric or malic acid, normally present in the juice. The most effective anions for the purpose are hydroxyl ($OH^-$), carbonate ($CO_3^=$) and bicarbonate ($HCO_3^-$).

In FIG. 1 the process has been illustrated where the caustic comprises NaOH. It will be seen that the membranes or films 12 are permeable to the $OH^-$ anions but are impermeable to the $Na^+$ and the $H^+$ cations. The membranes 12 are also permeable to the citrate. Thus, the citrate ions are permitted to pass from chamber 15 through the membrane 12 into chamber 17 to combine with the sodium to form sodium citrate while the hydroxyl ions are permitted to pass from compartments 16 and 17 into the center compartment 15 and combine with the hydrogen ($H^+$) to form water ($H_2O$).

While ion-exchange resins in the form of beads are most commonly used for ion-exchange, this form is not suitable for use in connection with a juice containing insoluble particles. The bed of resin beads acts as a filtering media to remove pulp, thus causing the ion-exchange column to plug up the flow of juice through an ion-exchange column which is eventually stopped through this plugging action. Furthermore, ion-exchange resin beads used in column form necessitates an intermittent or batch process and the resin must be frequently regenerated by the use of appropriate solutions. Such regeneration process causes serious dilution of the juice being treated at the beginning and end of each cycle when the fluid in the bed is being changed. Thus, ion-exchange resin in bead form is not suitable for continuous operation as required for commerical application. The ion-exchange resin in the form of film, as described in the aforementioned patents, permits continuous operation and eliminates the difficulties involved in the use of ion-exchange resin in bead form.

Figure 2:
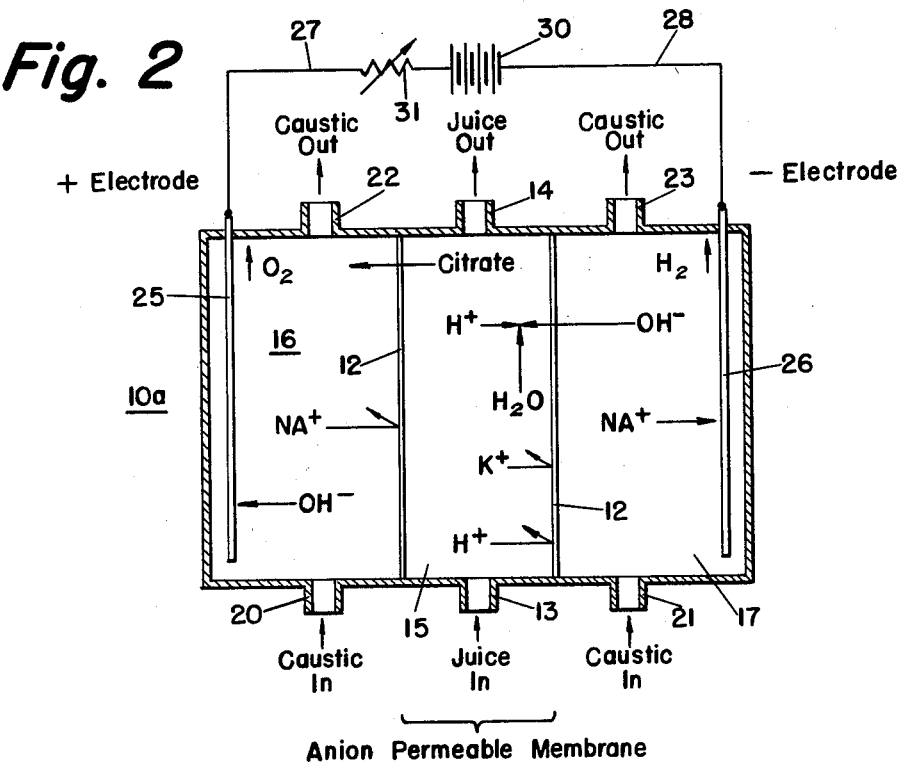
FIG. 2 is a diagrammatic view similar to FIG. 1 with the addition of electrodes for electrodialysis through anion permeable membranes to increase the pH by anion exchange.

The speed with which the process of ion-exchange takes place, as illustrated in FIG. 1, can be increased by the application of direct electric current to cause migration of the ions at speeds in excess of the diffusion rate. Such an arrangement is illustrated in FIG. 2 where electrodialysis takes place through anion permeable membranes. The cell 10a in FIG. 2 has been provided with a positive electrode 25 in chamber 16 and a negative electrode 26 in chamber 17. The electrodes 25 and 26 are connected by way of conductors 27 and 28 to the opposite sides of a source of direct current voltage, such, for example, as a battery 30. When current is passed between electrodes through the chambers 15–17, hydrogen is evolved at electrode 26 and oxygen at electrode 25. Since the other parts of the cell 10a in FIG. 2 are identical with those of cell 10 shown in FIG. 1, they have been identified with the same reference characters.

While the ion-exchange process has been illustrated in FIG. 2 under the influence of direct current passed through the sequence of solutions in one direction, it is to be understood that the exchange mechanism takes place regardless of the direction of the current passage. The direction of current may be reversed by reversing the connection of conductors 27 and 28 to the opposite sides of battery 30. Such reversal of current will remove materials which tend to stop up the pores of the membranes 12, keeping the electrical resistance of the films at a relatively constant value.

The pH value can be controlled either by adjusting the relative flow rate of the juice and solution such as by valves in the inlet lines or by adjusting the electric current, as by a variable resistance 31 in the series circuit with the battery 30.

The electrodialysis of fruit juice to raise the normal pH thereof to a desired value is desirable in order that the process will be performed with sufficient speed for commercial use. The following Table I gives examples of the ion exchange process to raise the pH of grapefruit juice.

*Table I*

| | Time | pH | Free acid concentration | Conditions |
|---|---|---|---|---|
| Run A | 0 | 3.26 | .252 | Juice electrodialyzed. Current density 10 milliamperes per square centimeter of cross-sectional area. |
| | 20 | 3.46 | .181 | |
| | 32 | 3.54 | .157 | |
| Run B | 0 | 3.20 | .249 | Juice dialyzed. No electric current used but other conditions same as in Run A. |
| | 20 | 3.23 | .221 | |
| | 40 | 3.29 | .213 | |
| | 60 | 3.32 | .208 | |

The juice as it leaves the outlet 14 after the completion of the process has been transformed from one normally having a pH value below the desired value and of a tart inferior taste to a juice the pH of which has been raised to the desired value by ionic transfer through an anion permeable resin to reduce tartness, resulting in a juice of improved taste.

It is to be understood that the sample cells 10 and 10a have been illustrated in FIGS. 1 and 2 as diagrammatic examples of dialysis and electrodialysis apparatus for performing the present process and that normally such apparatus includes a plurality of additional pairs of juice and caustic chambers thus providing a plurality of alternating juice and electrolyte chambers.

The present invention is not limited to raising the pH of fruit juices, but is also applicable to juices which require the lowering of the pH as described above in connection with juice from tomatoes, from certain localities, which have a high pH as a result of the high potassium citrate-citric acid ratio and thus are too low in acidity to be pasteurized easily preparatory to canning. The process in such applications is to replace the potassium with hydrogen ions across a cation-permeable membrane.

Figure 3:
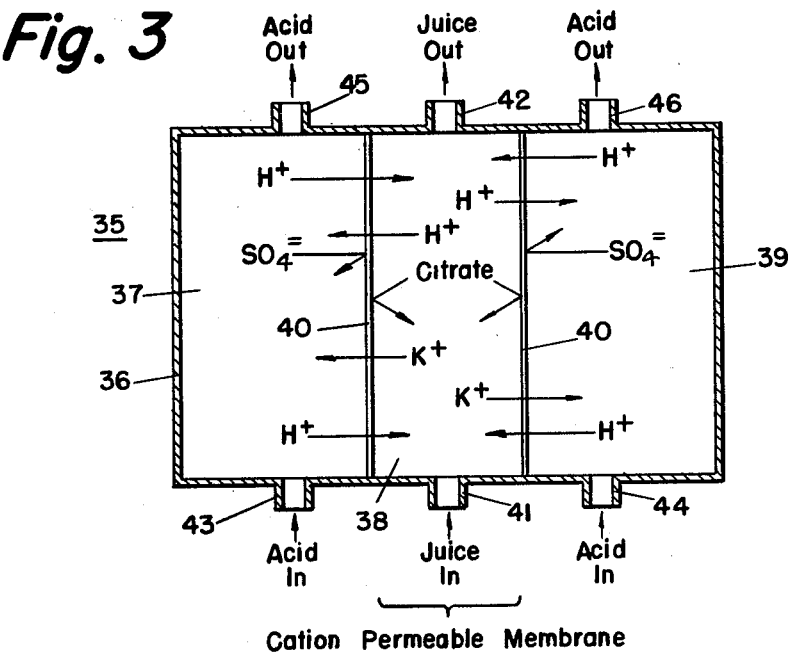
FIG. 3 is a diagrammatic view in elevation of a cross-section of a cell for lowering the normal pH of a fruit or vegetable juice to a desired value by cation exchange through cation permeable membranes.

A sample cell for lowering the pH of buffered solutions such as tomato juice or the like by the use of cation selective membranes is illustrated in FIG. 3. The cell 35 includes a container 36 which is separated into compartments 37–39 by a pair of cation permeable membranes 40 which may be of the type disclosed in the aforementioned Belgian patents. The membranes or films 40 provide the opposite walls of the central juice chamber 38. Juice is introduced through an inlet 41 at the lower end of container 36 and flows upwardly through chamber 38 where it passes outwardly through an outlet 42. The acid cells 37 and 39 which are disposed on opposite sides of the juice cell 38 are each provided with inlets 43, 44 and outlets 45 and 46 respectively.

In FIG. 3, the acid illustrated is $H_2SO_4$. It will be noted that the hydrogen ($H^+$) cations pass freely through the cation permeable membranes 40 while the sulfate ($SO_4$) anions do not pass through the membranes 40 but instead are confined within their respective compartments 37 and 39. The citrate anions likewise are confined within the central juice compartment 38 while the potassium cations are free to move from the juice chamber 38 through the opposite walls 40 into the adjacent acid chambers 37 and 39. While no cations can be substituted for hydrogen, ($H^+$), many anions may be substituted for sulfate ($SO_4^=$) such, for example, as $Cl^-$, $NO_3^-$, $PO_3^-$, $PO_4^\equiv$, acetate, citrate and lactate.

It is important to note that the pH of juice can be lowered at a rate which is commercially suitable by cation exchange without the application of electric current. In the examples given in the specification, the rate of cation exchange from tomato juice, without the application of electric current was faster than the anion exchange in the grapefruit run with an electric current of 10 milliamperes per square centimeter of cross sectional area.

The process by electrodialysis is approximately 2½ times as fast as the exchange-diffusion process. The reason for the relatively rapid reduction of pH by the exchange-diffusion process is due to the fact that the hydrogen ion is extremely mobile, moving about five times as fast as the potassium ion, itself a highly mobile ion. When citrate is being removed by exchange with the hydroxide ion, the hydroxide ion itself is relatively fast-moving, but the citrate ion is relatively slow-moving and its rate of diffusion or migration becomes rate-controlling. Accordingly, it is seen that an appreciable rate of replacement of potassium by hydrogen can be achieved without the assistance of an electric current.

Figure 4:
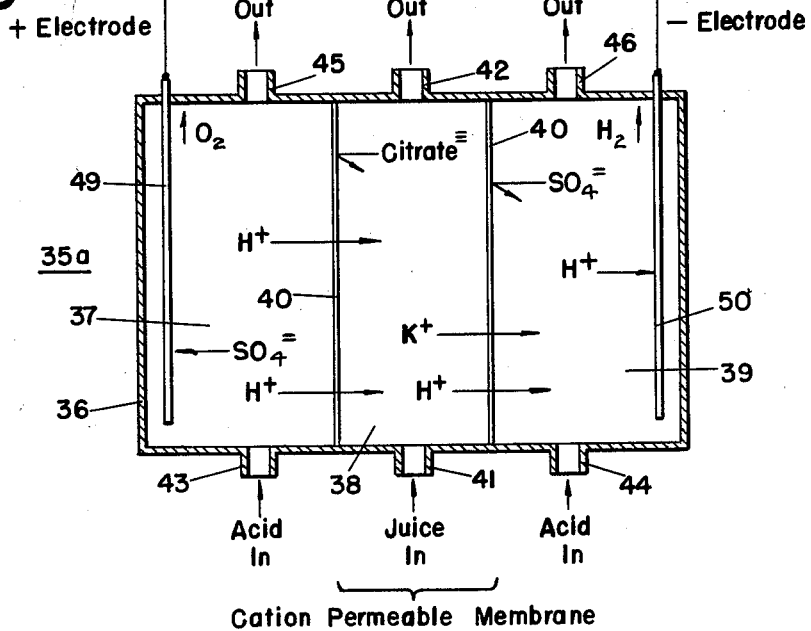
FIG. 4 is a diagrammatic view similar to FIG. 3 with the addition of electrodes for electrodialysis through cation permeable membranes to reduce the pH by cation exchange.

In FIG. 4 there is illustrated a sample cell 35a similar to cell 35 of FIG. 3 with the exception that electrodes 49 and 50 have been added and inserted in the respective compartments 37 and 39. The electrodes 49 and 50 are connected by way of the respective conductors 51 and 52 to the opposite sides of a source of direct current voltage illustrated as a battery 53. The electrodialysis of the juice with cation permeable membranes as shown in FIG. 4 increases the speed of reduction of pH but tends to increase surface contamination of the membranes 40. However, this may be minimized by reversing the connections of conductors 51 and 52 with respect to battery 53 thereby reversing the direction of current flow through the cell 35a.

The pH value of the juice can be controlled by adjusting the flow rate of the juice and the acid solution such as by valves in the inlet lines 41, 43, 44 or by adjusting the electric current, FIG. 5, as by a variable resistance 55 in series circuit with the battery 53.

In a specific example, tomato juice was passed through an electrodialysis unit similar to that shown in FIGURE 5. The unit used TNO cation-permeable membranes of the type described in the aforesaid Belgian patents and contained seven compartments, two of which were electrode compartments through which acid was passed, three were acid compartments through which 0.05 M or 0.1 N sulphuric acid was passed and tomato juice was passed through the remaining two compartments. Each juice compartment was surrounded on both sides by acid compartments. The area for each membrane was 57 cm.² A current density of 18.7 milliamperes per square cm. was employed so that a total current of 1.0 ampere was passed through the unit. The flow rate was 25 ml. per second for the juice and 20 ml. per second for the acid, both upflow. The volume of juice being recirculated was 1.0 liter.

The following Table II gives the lapsed time, the impressed voltage, the pH and the milliequivalents of hydrogen ions removed. It will be seen from Table II that after ten minutes the pH of the tomato juice had been lowered by 0.22 unit and 10.2 meq. of hydrogen ions had been added. The electrodialysis was continued until a more substantial drop in the pH was encountered and then exchange dialysis was allowed to continue for an additional period of time without the imposition of a direct current. Thus, Table II provides a comparison between the exchange-diffusion process without the use of electric current as contrasted with the electrodialysis process employing electric current.

*Table II*

| Time, min. | E volts | pH | H+ added meq. |
|---|---|---|---|
| 0 | 14 | 4.25 | 0 |
| 7 | 14 | 4.16 | 4.2 |
| 10.5 | 15 | 4.03 | 10.2 |
| 15 | 15 | 3.95 | 13.9 |
| 20 | 15 | 3.88 | 17.5 |
| 25 | 16 | 3.75 | 24.0 |
| 30 | 16 | 3.65 | 29.3 |
| 35 | 17 | 3.59 | 32.6 |
| 44 | 0 | 3.53 | 35.8 |
| 49 | 0 | 3.48 | 38.3 |
| 54 | 0 | 3.44 | 40.7 |
| 60 | 0 | 3.38 | 44.0 |
| 70 | 0 | 3.25 | 50.9 |

While the electrode arrangements illustrated in FIGS. 2 and 4 are the simplest, they are not necessarily the most practical. A number of arrangements of electrode materials and electrolytes can be used for the process. Some electrolytes which yield oxygen at the anode require the use of noble metal for the electrode. Carbon anodes can be used, but they have a limited life. Base metal electrodes may be used; however, they go into solution at a rapid rate in most electrolyte solutions. Inexpensive anodes, such as stainless steel, can be used by proper selection of surrounding anolytes separated from the other solutions by semi-permeable membranes. Migration of unwanted ions can be controlled by the type of membrane selected.

Referring to FIG. 5, there is diagrammatically illustrated electrodialysis apparatus 60 wherein the electrodes 61 and 62 have been placed in compartments separated from the other juice and solution compartments by means of membranes 63 and 64. The juice compartments J and the solution compartments S are separated from each other by membranes 65. In operation of the apparatus 60, the juice, the pH of which is to be adjusted to the desired value, is directed from a supply 66 through a flow control device 67, such as a valve or pump, to a header 68 which is flow connected to the inlets of the respective juice chambers J. At the same time, the electrolyte in concentrated form is directed from a supply 70 through a suitable proportioning pump P in a flow line 71 where it is mixed with water passing through flow control valve V to provide the electrolyte solution. The electrolyte solution then passes through a flow control device 73 such, for example, as a valve or pump and then into a header 74, which is connected to the various inlets to the solution chambers S. The anolyte and catolyte solution is directed from a supply 76 through a suitable flow control device 77 into the respective inlets to the electrode chambers E. The electrodes 61 and 62 are connected by way of the respective conductors 79 and 80 to the opposite sides of a source of direct current voltage illustrated as a battery 81. In series with the battery 81 is a variable resistance 82 for adjusting the current passing through the various compartments of the electrodialysis apparatus 60. The desired pH value for the juice as it leaves the apparatus 60 may be controlled either by adjusting the flow rates of the juice and the electrolyte solution or by varying the current passing through the juice and solution chambers J and S. An increase either in the current or in the residence time of the juice will increase the change of pH in the desired direction.

The electrodialysis apparatus 60 illustrated in FIG. 5 may be used for either raising or lowering the pH of juice depending upon the particular membranes and electrolyte solutions that are used, as now to be described. When the device 60 is used for raising the pH of the juice as by anion exchange between the juice and the electrolyte solution, the electrolyte supply 70 comprises caustic makeup and the membranes 65, which separate the juice and solution chambers are anion permeable membranes, such as described in connection with FIGURES 1 and 2. The membranes 63 and 64 which separate the electrode compartments E from the juice and solution compartments S may be either cation permeable membranes or anion permeable membranes and the anolyte and catolyte solution in the electrode compartments E which are supplied from the source 76 may contain any of cations: $NA^+$, $K^+$, $NH_3^+$ and anions: $OH^-$, $CO_3^=$, $HCO_3^-$, $SO_4^=$, $NO_3^-$, $PO_3^-$, $PO_4^\equiv$, and acetate. While the anolyte and catolyte supply 76 is illustrated as separate from the caustic supply for the solution chambers S, it is to be understood that such supplies may be derived from the same source if desired, since the electrolyte in the solution chambers and in the electrode chambers may be the same.

When the device 60 is being used to reduce the pH of the juice, cation selective membranes 65 are employed between the juice and solution chambers and either cation or anion permeable membranes may be used for the membranes 63 and 64 of the electrode compartments E. When using the device 60 to lower the pH of the juice, the anolyte and catolyte supply 76 may be the same as that previously described and may contain the same cations and anions. The supply 70 for the solution chambers S will constitute an acid as previously described in connection with FIGURES 3 and 4.

As previously mentioned in connection with FIGS. 2 and 4, in the electrodialysis form of the apparatus the direction of current may be reversed so as to remove the materials which tend to stop up the pores of the membranes, thus keeping the electrical resistance of the films or membranes at a relatively constant value. In FIG. 5, it will be noted that the conductors 79 and 80 are connected to the battery 81 by way of a reversing switch 84, movable contacts a and b of which are adapted to engage, respectively, either contacts c and d or e and f. The movable contacts a and b of switch 84 are adapted to be moved from engagement with contacts c and d to engagement with contacts e and f by means of a solenoid 85 which is energized periodically from an electrical timer mechanism 86. The timer 86 is provided with a control knob 87 which cooperates with a scale 88 to indicate the period of time for which the timer is set. For example, if it is determined that the current reversal should take place once each one-half hour, then the timer will be set for thirty-minute intervals and the solenoid 85 will move the movable contacts a and b of switch 84 out of engagement with contacts c and d at the end of the thirty-minute period and into engagement with the contacts e and f where they will remain until the passage of a second thirty-minute interval. It will be understood that the period of time for which the timer is set will depend upon the amount of time required for the pulp or solid materials in the juice to clog the pores of the respective membranes which separate the cells.

While the apparatus 60 in FIGURE 5 has been illustrated as including three solution chambers S separated by a pair of juice chambers J, it is to be understood that additional juice and solution chambers may be added in accordance with the desired output of juice from the electrodialysis apparatus.

For example, in one electrodialysis device, constructed in accordance with the present invention, which was adapted to deliver at least two hundred fifty gallons per hour of juice, there were employed two electrode compartments, thirteen solution compartments and twelve juice compartments. The compartments were substantially rectangular in cross-section and were separated by rectangular frames somewhat similar to the construction shown in Patent 2,894,894. The power supply was derived from a unit capable of delivering 240 volts D.C. and a current of 150 amperes so as to provide an effective current density in the order of 20 amperes per square foot, with the membranes having an approximate area of 3' square. The frames were made from ¼" stock and were provided with ⅛" feed holes drilled edgewise through the stock on one pair of opposite sides. The frames were assembled in the stack in alternate positions displaced 90° from each other with a membrane between adjacent frames so that the flow of juice through the device was in one direction, while the flow of solution was through the device at 90° from the juice flow. The electrodes were made from stainless steel sheet approximately ³⁄₁₆" thick and the anolyte and catolyte streams were predominantly sodium hydroxide or sodium sulfate. For raising the pH of the juice, anion-permeable membranes were employed of the type previously described and for lowering the pH of the juice, cation-permeable membranes were employed of the type previously described. The power consumption for treating 1,000 gallons of juice was approximately 80 kwh. However, by decreasing the thickness of each frame from ¼" to ⅛", the voltage requirements may be approximately cut in half.

What is claimed is:

1. In a method of improving the taste of fruit and vegetable juices having a normal pH within the range of about 2.5 to about 5.5, by adjusting the pH within a range of about ±0.5 pH to a desired value affording improved taste, the step of flowing said juice and an electrolyte separately through alternate compartments of an electrodialysis device having ion selective membranes all permeable to ions of the same sign, thereby creating ion exchange through said membranes and changing the pH of the juice to the desired value by substitution of electrolyte ions for ions originally present in the juice.

2. A method according to claim 1 in which all of the membranes are of cation exchange material.

3. A method according to claim 1 in which all of the membranes are of anion exchange material.

4. In a method for improving the taste of fruit and vegetable juices having a normal pH within the range of about 2.5 to about 5.5, by increasing the pH within a range up to about 0.5 pH to a desired value affording improved taste while substantially maintaining the vitamin content, the step of flowing said juice and an alkaline solution separately through alternate compartments of an electrodialysis device having ion selective membranes all permeable to anions, thereby creating an ion exchange through said membrane and reducing the anion concentration in the juice by substitution in the juice of an anion of a more weakly ionized acid for a portion of the organic acids normally present in the juice and thereby reducing the acidity of the juice while maintaining the concentration of salts normally present in the juice.

5. In a method of improving the taste of fruit and vegetable juices having a normal pH within the range of about 2.5 to about 5.5, by decreasing the pH within a range up to about 0.5 pH to desired value affording improved taste while substantially maintaining the vitamin content, the step of flowing said juice and an acid separately through alternate compartments of an electrodialysis device having ion selecive membranes all permeable to cations, thereby and thereafter creating an ion exchange through the membrane and increasing the hydrogen ion concentration in the juice by substituting hydrogen ions for a portion of the cations normally present in the juice.

6. A method according to claim 1 in which the juice is selected from the group consisting of citrus fruit and pintapple, grapes, apple and tomato juices.

7. In the method of treating natural fruit and vegetable juices having a normal pH of from about 2.5 to about 5.5, the step of adjusting the pH within a range of about ±0.5 pH from the normal pH by flowing said juice and an electrolyte separately through alternate compartments of an electrodialysis device, said compartments being defined by spaced ion-selective membranes all permeable to ions of the same sign, and inducing ion exchange through the membranes to change the relative concentration of acids and salts in the juice, said electrolyte containing ions selected from the group consisting of hydrogen, sodium, potassium, magnesium, ammonium, sulphate, acetate, citrate, lactate, chloride, hydroxyl, carbonate, bicarbonate, nitrate and phosphate.

8. The method according to claim 7, in which the juice is a citrus fruit juice including grapefruit and orange juices.

References Cited in the file of this patent
UNITED STATES PATENTS

| | | |
|---|---|---|
| 1,840,105 | Kean | Jan. 5, 1932 |
| 2,116,920 | Wickenden | May 10, 1938 |
| 2,259,046 | Roberts | Oct. 14, 1941 |
| 2,478,298 | Meschter et al. | Aug. 9, 1949 |
| 2,494,257 | Nichol | Jan. 10, 1950 |
| 2,667,417 | Delmousee | Jan. 26, 1954 |
| 2,848,402 | De Hass Van Dorsser et al. | Aug. 19, 1958 |
| 2,894,894 | Kressman et al. | July 14, 1959 |
| 2,897,130 | Van Dorsser et al. | July 28, 1959 |